April 3, 1934.  M. MICHEL  1,953,249
METHOD OF STANDARDIZING RONTGEN RAY PHOTOGRAPHS
Filed Feb. 20, 1929  2 Sheets-Sheet 1
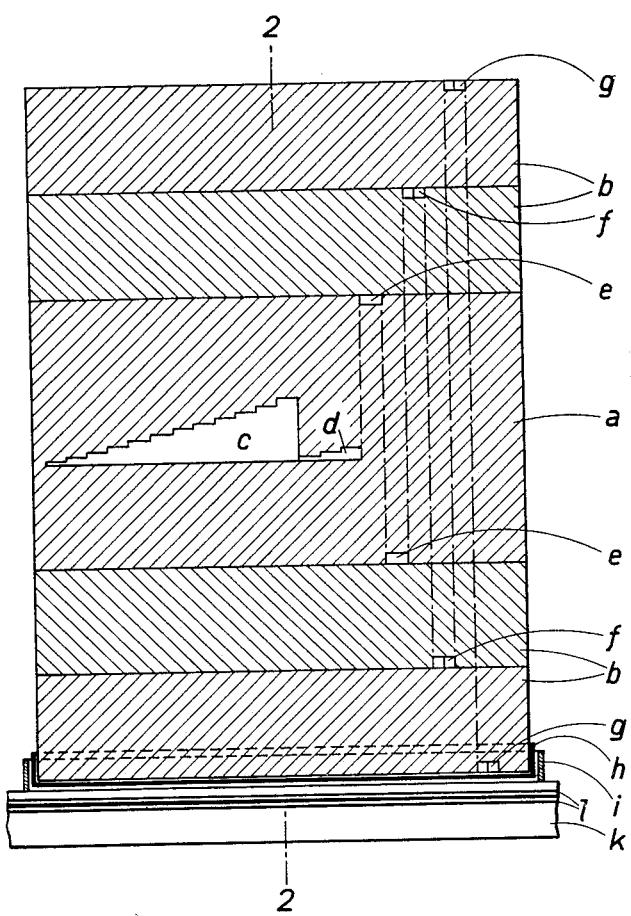
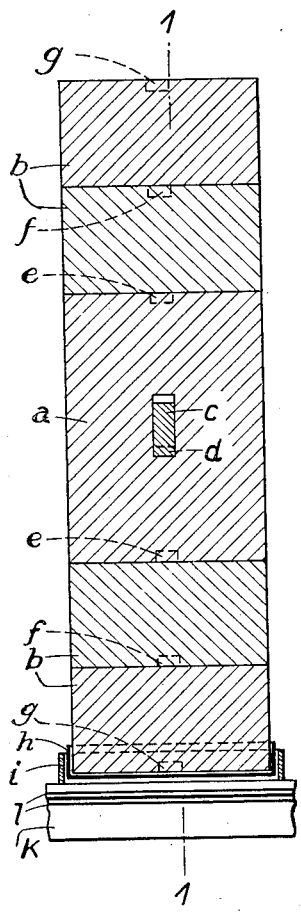
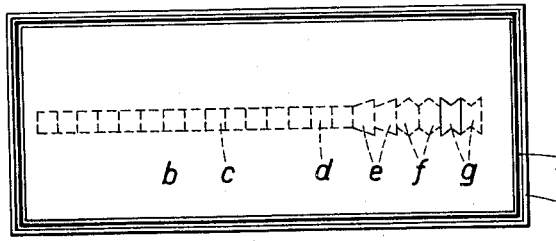

April 3, 1934.                M. MICHEL                1,953,249
              METHOD OF STANDARDIZING RONTGEN RAY PHOTOGRAPHS
                      Filed Feb. 20, 1929      2 Sheets-Sheet 2

INVENTOR:

Patented Apr. 3, 1934

1,953,249

UNITED STATES PATENT OFFICE 1,953,249

METHOD OF STANDARDIZING RÖNTGEN RAY PHOTOGRAPHS

Max Michel, Pirmasens, Germany

Application February 20, 1929, Serial No. 341,381
In Germany July 23, 1928

5 Claims. (Cl. 250—34)

Attempts have been made towards systematizing diagnosis with Röntgen rays by the use of values, ascertained empirically, of the milliampere-second, the maximum or effective voltage being stated. This method cannot be employed as it involves serious sources of error, such as the failure to take into account the diverse curve forms of the apparatus, the differences in the emulsions, the intensification factors of the intensifying screens, the photochemical processes, and the different thicknesses of the absorbent layers. That these sources of error exist is well known.

If L indicates the quantity of light, $i$ the intensity, and $t$ the time of exposure, there is $L=i.t^p$. In this equation $p$ is a constant depending on the sensitiveness of the emulsion. This constant is less than 1 in the case of light rays, but equal to 1 in the case of Röntgen rays. In modern film photography the fluorescent radiation of the intensifying screens is of deciding importance. As in this case the constant $p$ is less than 1, nothing is gained in clarity by stating the product $i.t$. In using intensifying screens the proportion of the intensity to the time of exposure is therefore very important.

The consequence is that there are great differences between the exposures made by different institutes using the same voltage and value of the milliampere-second, so that the interpretation of such exposures is rendered extremely difficult. Even exposures, carried out for making comparisons, by one and the same Röntgen institute may differ considerably amongst themselves in the images produced and in clearness.

The object of this invention is to eliminate these sources of error and to obtain a perfectly satisfactory method of standardizing Röntgen photographs. For this purpose, in taking the photographs a graduable test body is simultaneously brought, always in the same manner, into the direct path of the rays, and its photographic image on the Röntgen film or plate is evaluated photometrically in a determined manner. In this way the multiplicity of physical, chemical and photo chemical conditions are preserved by graphic representation of the differences of density of the Röntgen photographs of the test body referred to, so that in obtaining the same graphic picture at some other position the same picture conditions are ensured at this position.

Figure 4:
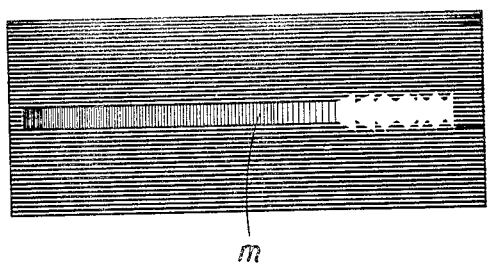
Figure 5:
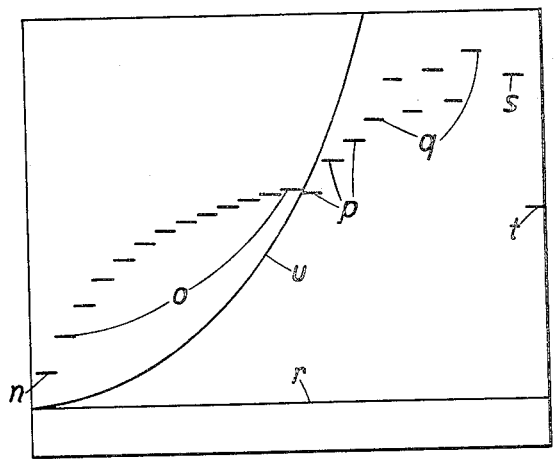

A test body of the kind referred to is illustrated in the acompanying drawings in which
Fig. 1 is a vertical section on the line 1—1 of Figure 2, Fig. 2 is a vertical section on the line 2—2 of Figure 1, Fig. 3 is a plan. Fig. 4 shows the negative image of this test body as obtained by X-raying, and Fig. 5 shows a corresponding standardization curve as obtained by automatic photoelectric registration.

The test body consists of the main part $a$ and a number of plates $b$ of smaller height or thickness which can be placed in position above or below the part $a$. The part $a$ and the plates $b$ are made of a substance whose capacity of absorption in respect of Röntgen rays is very similar to that of the texture of the soft parts of the human body, for instance, they may consist of paraffin or a mixture of ceresine and colophony. In the middle of the part $a$ a stepped aluminium block $c$ is provided, and, adjoining it, a stepped copper block $d$, so as to secure the photometric representation of the contrasting curves of these two stepped blocks in a definite and convenient manner. A small piece of lead $e$, about one-eighth of an inch thick is fitted into the upper and the lower face of the part $a$, and a similar piece of lead $f$ or $g$ is fitted into the upper or lower face of the plates $b$. These pieces of lead $e$, $f$ and $g$ are so arranged that their projection forms the continuation of the blocks $c$ and $d$ (Figure 3). Every two successive and similarly lettered pieces of lead have the same shape in plan, but which differs from that of the other four. By removing certain ones or all of the plates $b$ the test body can be graduated as desired. Instead of aluminium, copper and lead, other substances may be used, whose conditions of absorption, with respect to Röntgen rays, are the same as or quite similar to those of these metals.

The image of this test body, which was also subjected to the exposure, presents a series of juxtaposed different stages of blackening, which are determined photometrically. This is done by means of automatic photo-electric registration in the following manner:

A pencil of light rays concentrated by an optical system is caused to pass through the film with the image of the test body and to fall upon a photo-electric cell, which consequently gives a current impulse. This impulse is registered by a galvanometer in known manner. The sensitive paper, on which this registration is made, and the film are placed on a common carriage, so that the scale of the curve registered corresponds exactly to the distribution of brightness in the measuring line. The whole process takes place automatically, so that the only work to be done is the insertion of the film and of the sensitive paper. The advantage of this method consists not only in an essential reduction of time but also in the possibility of bringing every desired density into the most favorable part of the characteristic by increasing the quantity of light or the voltage.

Thus, the graphical obtainment of the image of the test body simultaneously subjected to the exposure takes place by transmitting the different reductions of a pencil of light rays by the different stages of blackening of the test body photograph, by means of a photo-electric cell, to a system of mirror galvanometers or single-thread electrometers, which registers the reductions on a photographic plate or film in known manner. For the exact determination of the blackening a Goldberg grey wedge may be used, the blackening stages of which are known; the constancy of the working conditions can be tested by simultaneously registering different apparatus constants.

To avoid over-radiation and too great a flattening of the curves resulting therefrom, a thin film $h$ of a certain alloy, for instance a lead alloy, may either be stretched, by means of a leaden ring $i$, over the lower face of the test body $a$—$b$ that is to say disposed between the test body and the cassette $k$ or applied on the backs of the intensifying screens $l$.

As this arrangement provides photometrically a considerable improvement in contrast at voltages above 70 K.V. max. by filtration of the stray rays, it is to be recommended not only for the test body but also for all object exposures which fall within the range of the use of voltages of over 70 K.V.

The method of standardization is as follows:

Large standardization blocks are prepared, which possess the same conditions of absorption and dispersion as occur in the various organs concerned in Röntgen diagnostics. These standardization blocks likewise consist of a substance whose capacity of absorption with respect to Röntgen rays is quite similar to that of the texture of the soft parts of the human body. Such a standardization block may, for example, consist of water receptacles, like those already described by Bronkhorst, as absorption and dispersion media. These receptacles are arranged one above the other. The depth of the water can be regulated; in the air space between the receptacles stepped blocks of aluminium, copper and lead or a substance which has the same or similar conditions of absorption, are arranged. I employ principally standardization blocks of paraffin or a mixture of ceresine and colophony, which imitate roughly the actual conditions of the organs and into which the stepped blocks above described are cast.

Of these standardization blocks each of which corresponds to an organ, Röntgen photographs are taken under the most varied conditions, until the image of the stepped blocks and the conditions of the entire picture (for instance, inter alia, the amount of veiling on development) give optimum contrast curves, which are exactly produced photometrically. If the standardization blocks are set correctly, the exposures of the organs corresponding to the standardization blocks will not fail in giving also optimum contrast values.

Photographs of the different organs are now taken under the conditions found to produce the optimum values with agreement between all other physical and chemical factors, a small standardization block such as that shown by the hereinbefore described test body according to Figures 1, 2 and 3, being simultaneously subjected to the Röntgen rays exposure always in the same manner. In making practical use of the results in taking the photographs of the organs the image of this small standardization block or test body, which was also subjected to the exposure, is photometrically evaluated by means of automatic photoelectric registration. The resulting curves are regarded as standard curves. It is a simple matter to make a comparison between each curve corresponding to particular working conditions and a standard curve obtained in the manner described. The production of such a curve of a film or plate photograph takes two minutes. The photometric evalution affords inter alia the possibility of determining not only the general conditions but also the voltage existing at the moment the photograph is taken, by the half value layer.

On the negative the above said aluminium and copper blocks $c$ and $d$ and the small pieces of lead $e$ appear as a stripe $m$ of slowly increasing blackness. The photometric exploitation of this X-ray photograph will present the curve corresponding always to the optimal conditions. In the curve shown in Fig. 5 the step $n$ is that of the basic blackening, the following twelve steps $o$ correspond to those of the aluminium block $c$, the following three steps $p$ correspond to those of the copper block $d$, and the following three pairs of steps $q$ correspond to the small pieces of lead $e$. The first, third and fifth of the steps $q$ are characteristic of the hazy fog, the second, fourth and sixth are characteristic of the developing fog.

$r$ is the zero-line. This is drawn by the photometer when no light whatsoever falls on the photo-electric cell. $s$ and $t$ are the constants of the apparatus serving as control lines for the technical conditions of the photo-electric outfit, i. e. for the tension in the circuit of the photoelectric cell, for the heating current of the galvanometer lamp, etc. The individual values of the black shades in their consecutive order give an accurate and comparable picture of all physical, chemical and photo-chemical conditions that always have to be taken into account when an X-ray film or an X-ray plate is produced. $u$ is the line corresponding to a Goldberg grey wedge used in the photometric work in order to obtain the absolute values of the individual shades of black. A simple calculation and mensuration of the curves furnish the absolute value of the individual blacks.

What I claim as my invention and desire to secure by Letters Patent is:

1. A method of standardizing Röntgen ray photographs consisting in that in taking the photographs a graduable test body is simultaneously brought, always in the same manner, into the direct path of the rays, and in photometrically evaluating the image of the test body to obtain a curve and comparing the curve so obtained with a standard curve.

2. A method of standardizing Röntgen ray photographs consisting in that in taking the photographs a graduable test body and a thin film of an alloy are simultaneously brought, always in the same manner, into the direct path of the rays, and in photometrically evaluating the image of the test body to obtain a curve and comparing the curve so obtained with a standard curve.

3. A test body for standardizing Röntgen ray photographs by bringing said test body simultaneously into the direct path of the rays, said test body being made of a substance whose capacity of absorption with respect to Röntgen rays is very similar to that of the texture of the soft parts of the human body, and having embedded therein a series of pieces of aluminium, copper and lead.

4. A test body for standardizing Röntgen ray photographs by bringing said test body simultaneously into the direct path of the rays, said test body being made of a substance whose capacity of absorption with respect to Röntgen rays is very similar to that of the texture of the soft parts of the human body, and having embedded therein a series of pieces of substances whose capacity of absorption with respect to Röntgen rays are quite similar to those of aluminium, copper and lead respectively.

5. A test body for standardizing Röntgen ray photographs by bringing said test body simultaneously into the direct path of the rays, said test body being made of a substance whose capacity of absorption with respect to Röntgen rays is very similar to that of the texture of the soft parts of the human body, and consisting of a main plate and a number of plates of smaller dimension, a portion of said smaller plates being removably positioned above and the remaining portions removably positioned below said main plate, the latter having embedded in its middle a stepped aluminium block and adjoining the same a stepped copper block and embedded in its upper and lower faces a small piece of lead, and each of said smaller plates having embedded therein in one of its faces a similar piece of lead, said pieces of lead being arranged so that their projections form the continuation of said aluminium and copper blocks.

MAX MICHEL.